(12) United States Patent
Oikawa (10) Patent No.: US 9,423,979 B2
(45) Date of Patent: Aug. 23, 2016

(54) MEMORY SYSTEM AND MEMORY CONTROLLER FOR DETERMINING WHETHER ONE OR PLURALITY OF POINTERS CAN BE STORED IN A SECOND BUFFER AND FOR EXECUTING DATA TRANSFER BETWEEN DATA BUFFER AND HOST USING THE POINTERS

(71) Applicant: Kabushiki Kaisha Toshiba, Minato-ku (JP)

(72) Inventor: Kohei Oikawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 98 days.

(21) Appl. No.: 14/447,812

(22) Filed: Jul. 31, 2014

(65) Prior Publication Data

US 2015/0254022 A1    Sep. 10, 2015

Related U.S. Application Data

(60) Provisional application No. 61/950,563, filed on Mar. 10, 2014.

(51) Int. Cl.
*G06F 3/00* (2006.01)
*G11C 16/00* (2006.01)
*G06F 12/00* (2006.01)
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
None
See application file for complete search history.

(56) References Cited

U.S. PATENT DOCUMENTS

| 8,321,627 | B1 * | 11/2012 | Norrie | G06F 13/161 |
| | | | | 365/185.33 |
| 2009/0037652 | A1 | 2/2009 | Yu et al. | |
| 2009/0172257 | A1 | 7/2009 | Prins et al. | |
| 2009/0172308 | A1 * | 7/2009 | Prins | G06F 13/1657 |
| | | | | 711/154 |
| 2010/0262757 | A1 | 10/2010 | Sprinkle et al. | |

FOREIGN PATENT DOCUMENTS

| JP | 2011-508349 | 3/2011 |
| JP | 2012-523619 | 10/2012 |
| WO | 2009/086371 A1 | 7/2009 |
| WO | 2010/117878 A1 | 10/2010 |

* cited by examiner

*Primary Examiner* — David E Martinez
(74) *Attorney, Agent, or Firm* — Oblon, McClelland, Maier & Neustadt, L.L.P.

(57) ABSTRACT

According to one embodiment, a first controller determines whether one or a plurality of pointers corresponding to a buffered command can be stored in a second buffer. The first controller stores the pointers in the second buffer when the pointers can be stored in the second buffer. The first controller causes a second controller to execute the command and to perform data transfer between a non-volatile memory and a data buffer, and executes data transfer between the data buffer and a host using the pointers stored in the second buffer.

16 Claims, 7 Drawing Sheets

MEMORY SYSTEM AND MEMORY CONTROLLER FOR DETERMINING WHETHER ONE OR PLURALITY OF POINTERS CAN BE STORED IN A SECOND BUFFER AND FOR EXECUTING DATA TRANSFER BETWEEN DATA BUFFER AND HOST USING THE POINTERS

CROSS-REFERENCE TO RELATED APPLICATIONS

This application is based upon and claims the benefit of priority from U.S. Provisional Patent Application No. 61/950,563, filed on Mar. 10, 2014; the entire contents of which are incorporated herein by reference.

FIELD

Embodiments relate generally to a memory system and a memory controller provided with a non-volatile memory.

BACKGROUND

In storages using a flash memory, a high-speed PCI-Express (PCIe) is increasingly employed as a host interface. As a storage-side protocol of PCIe connection, NVM-Express (NVMe), and the like have appeared.

In a system in which a host device and a storage device are connected by the PCIe, a command, data, and a pointer pointing to a location of the data are placed in a memory inside the host device. A data region is fixed to have a predetermined size, and a pointer exists with respect to each data region. Therefore, the number of pointers is increased as the data size becomes larger.

The storage device needs to acquire pointers from the host device in order to execute a command. If the storage device tries acquiring all of pointers corresponding to a command, execution of which is instructed, a memory capacity therefor is increased.

DETAILED DESCRIPTION

According to the present embodiment, a memory system is connected to a host device. The host device includes a memory in which a command, a pointer that indicates a location of data, and data are stored. The memory system includes a non-volatile memory including a plurality of blocks, the block being a unit of data erasure, a data buffer, a first controller, and a second controller. The first controller acquires the command from the memory of the host device, and performs first data transfer between the memory of the host device and the data buffer. The second controller performs second data transfer between the non-volatile memory and the data buffer according to the command. The first controller includes a first buffer, a second buffer, and a control unit. The control unit buffers the command acquired from the memory in the first buffer, determines whether one or a plurality of pointers corresponding to the buffered command can be stored in the second buffer, stored the pointers in the second buffer when the pointers can be stored in the second buffer, causes the second controller to execute the command and to perform the second data transfer, executes the first data transfer corresponding to the command using the pointers stored in the second buffer, and waits the execution of the command until the pointers can be stored in the second buffer when the pointers cannot be stored in the second buffer.

Hereinafter, a memory system and a method of controlling a memory controller according to embodiments will be described in detail with reference to the appended drawings. Note that the present invention is not limited by these embodiments.

First Embodiment

Figure 1:
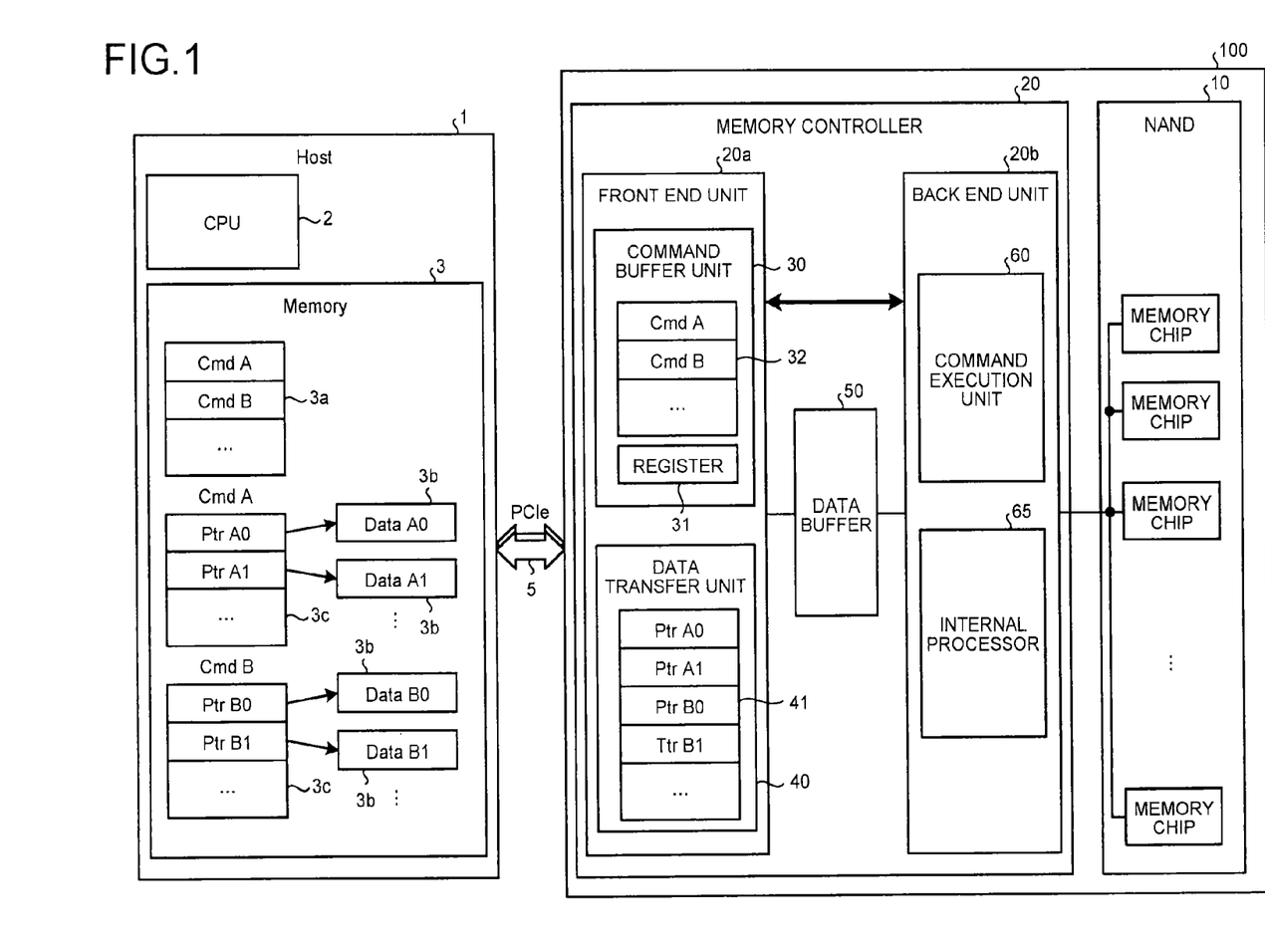
FIG. 1 is a function block diagram illustrating an internal configuration of a memory system of a first embodiment.

FIG. 1 illustrates a configuration example of a solid state drive (SSD) 100, as an example of a memory system. The SSD 100 is connected with a host device (hereinafter, abbreviated as host) 1 through a PCI-Express (PCIe) 5, and functions as an external storage device of the host 1. The host 1 is, for example, a personal computer, a mobile phone, an imaging device, or the like.

The host 1 includes a CPU 2 and a host memory 3 as a main memory. In the host memory 3, a command region 3a in which commands are arranged, a data region 3b in which data is arranged, and a pointer region 3c in which pointers that point to the location of data regions 3b exist. The size of one data region 3b is fixed, and is 4 KB, for example. One pointer exists with respect to one data region.

The SSD 100 is configured from a NAND flash 10 (hereinafter, abbreviated as NAND) as a non-volatile semiconductor memory and a memory controller 20. The memory controller 20 includes a front end unit 20a, a back end unit 20b, and a data buffer 50. As the non-volatile semiconductor memory, another memory, such as a resistance random access memory (ReRAM), may be used. As the data buffer 50, a static random access memory (SRAM) or a dynamic random access memory (DRAM) is used.

The SSD 100 fetches a command on the host memory 3, performs processing, such as logical/physical address translation, based on the content, and accesses the NAND 10. In a case of a read command, read data is transferred from the NAND 10 to the host memory 3 through the data buffer 50. In a case of a write command, write data is transferred from the host memory 3 to the NAND 10 through the data buffer 50.

The NAND 10 stores user data provided from the host 1, management information of the user data, system data, and the like. The NAND 10 includes a plurality of memory chips. The plurality of memory chips can execute a parallel operation using channel parallel, plane parallel, bank interleave, or the like.

Each memory chip includes a memory cell array in which a plurality of memory cells is arranged in a matrix manner, and a page register (page buffer). The page register buffers one page of write data to the memory cell array or read data from the memory cell array. Each memory cell is capable of multi-level storage. Each memory chip is configured such that a plurality of physical blocks is arranged. The physical block is a unit of data erasure. Further, in the NAND 10, write or read of data is performed for each physical page. The physical block is configured of a plurality of physical pages.

The front end unit 20a includes a command buffer unit 30 and a data transfer unit 40. The front end unit 20a has a function to acquire a command from the host 1, and transfers data between the host 1 and the data buffer 50.

The back end unit 20b includes a command execution unit 60 and an internal processor 65. The back end unit 20b has a function to execute the command acquired by the front end unit 20a, and transfers data between the data buffer 50 and the NAND 10. The data buffer 50 temporarily stores data transferred between the host 1 and the NAND 10.

The command execution unit 60 executes various commands from the host 1, such as a write request and a read request. The command execution unit 60 executes a plurality of commands by parallel driving a plurality of memory chips in parallel. The command execution unit 60 activates the plurality of memory chips of the NAND 10 necessary for data transfer, and executes the data transfer between the plurality of activated memory chips and the data buffer 50. Further, the command execution unit 60 executes update of management information, such as a logical/physical translation table that indicates a correspondence relation between a logical address provided from the host 1 and a physical address (storage location) of the NAND 10, non-volatile control, and the like. When completing execution of a command provided from the front end unit 20a, the command execution unit 60 notifies the front end unit 20a of the command execution completion.

The internal processor 65 executes garbage collection processing, wear leveling processing of the NAND 10, and the like.

The command buffer unit 30 of the front end unit 20a includes a control register 31 and a command buffer 32, and has a function to acquire a command from the host memory 3, a function to analyze the command acquired from the host 1, a function to notify the command execution unit 60 of the back end unit 20b of an executable command and to cause the command execution unit 60 to execute the command. Register information is set to the control register 31 by the CPU 2 of the host 1. The register information specifies presence or absence of commands, the order of commands, and the number of commands. The command buffer unit 30 recognizes the existence of commands on the host memory 3 by written in content of the control register 31.

Commands fetched from the host memory 3 by the command buffer unit 30 are buffered in the command buffer 32 in the specified order of the host 1. The command buffer unit 30 executes analysis processing about the commands buffered in the command buffer 32, a command execution instruction to the command execution unit 60, and the like basically in the specified order of the host 1.

The commands are classified into two types (first type and second type) according to the data size. As described above, the size of the data region 3b, which is one of the host memory 3, is fixed, and is 4 KB, for example. Also, one pointer exists with respect to one data region. Therefore, the number of data regions 3b is increased as the data size becomes larger, and the number of necessary pointers Ptr is thus increased.

When the data size is a threshold C or less (for example, the data size corresponds to one or two pointers), the command includes:
    a type of the command (read, write, or the like);
    a logical address (for example, logical block addressing (LBA));
    the data size;
    head pointer (PtrA0 in a case of a command A); and
    a second pointer (PtrA1 in a case of the command A). As described above, the first type command having the data size of the threshold C or less includes a pointer itself as pointer information.

When the data size is larger than the threshold C (for example, the data size corresponds to three or more pointers), the command includes:
    a type of the command (read, write, or the like);
    a logical address (for example, LBA);
    the data size;
    a head pointer (PtrA0 in a case of the command A); and
    pointer addresses as pointer location information, which indicate locations of all of the second and subsequent pointers (addresses on the host memory 3, in which all of the second and subsequent pointers exist).

As described above, the second type command having the data size larger than the threshold C includes the head pointer and the pointer addresses of the second and subsequent pointers, as the pointer information.

The command buffer unit 30 analyzes commands in the specified order of the host 1. When all of pointers specified by one command can be stored in a pointer buffer 41 of the data transfer unit 40, the command buffer unit 30 outputs an execution instruction of the command to the command execution unit 60 of the back end unit 20b, and notifies the data transfer unit 40 of the command. However, when all of pointers specified by one command cannot be stored in the pointer buffer 41, the command buffer unit 30 waits the execution instruction of the command to the command execution unit 60 and the notification of the command to the data transfer unit 40 until the storage of the pointers in the pointer buffer 41 becomes available.

The data transfer unit 40 includes the pointer buffer 41. The pointer buffer 41 has a predetermined buffer capacity, and has a first in first out (FIFO) structure, for example. Pointers stored in the pointer buffer 41 are necessary for the data transfer between the NAND 10 and the host memory 3 performed in the SSD 100. Therefore, the capacity of the pointer buffer 41 defines a maximum data size of the parallel processing performed in the SSD 100. That is, the front end unit 20a and the back end unit 20b can perform parallel processing of commands of the data size corresponding to the number of pointers that can be stored in the pointer buffer 41.

When the first type command is notified from the command buffer unit 30, the data transfer unit 40 buffers the head pointer and/or the second pointer included in the pointer information in the pointer buffer 41. Further, when the second type command is notified from the command buffer unit 30, the data transfer unit 40 buffers the head pointer included in the pointer information in the pointer buffer 41, and acquires the second and subsequent pointers from the host memory 3 using the pointer location information of the second and subsequent pointers included in the pointer information. The acquired second and subsequent pointers are buffered in the pointer buffer 41.

The data transfer unit 40 performs data transfer between the host memory 3 and the data buffer 50 using the pointers buffered in the pointer buffer 41. The pointer buffer 41 has a FIFO structure, and the pointers are deleted (invalidated) in the same order as the order in which the pointers are stored in the pointer buffer 41. The order of use (execution order) of a plurality of pointers stored in the pointer buffer 41 is not defined, and arbitrary. A pointer in the pointer buffer 41 is deleted (invalidated) when execution of a command to which the pointer belongs is completed.

When a command is a read command, the data transfer unit 40 transfers read data from the NAND 10, which is buffered in the data buffer 50, to a location on the host memory 3 specified by the pointer buffered in the pointer buffer 41. When the data transfer related to all of the pointers included in the command is completed, the data transfer unit 40 deletes one to the plurality of pointers included in the command from the pointer buffer 41. Note that, when the command is not the oldest command among a plurality of commands, pointers of which are stored in the pointer buffer 41, after the oldest command is completed and the oldest pointer corresponding to the oldest command is deleted from the pointer buffer 41, the pointer corresponding to the command is deleted from the pointer buffer 41.

When the command is a write command, the data transfer unit 40 transfers write data on the host memory 3, the location of which is specified by the pointer buffered in the pointer buffer 41, to the data buffer 50. The write data buffered in the data buffer 50 is written in the NAND 10 by the command execution unit 60. The command, the write of which to the NAND 10 by the command execution unit 60 is completed, is notified from the command execution unit 60 to the front end unit 20a. When notifying the completion of the command from the command execution unit 60, the data transfer unit 40 deletes one to a plurality of pointers included in the notified command from the pointer buffer 41. Note that, when the command is not the oldest command among a plurality of commands, pointers of which are stored in the pointer buffer 41, after the oldest command is completed and the oldest pointer corresponding to the oldest command is deleted from the pointer buffer 41, the pointer corresponding to the command is deleted from the pointer buffer 41.

Figure 2:
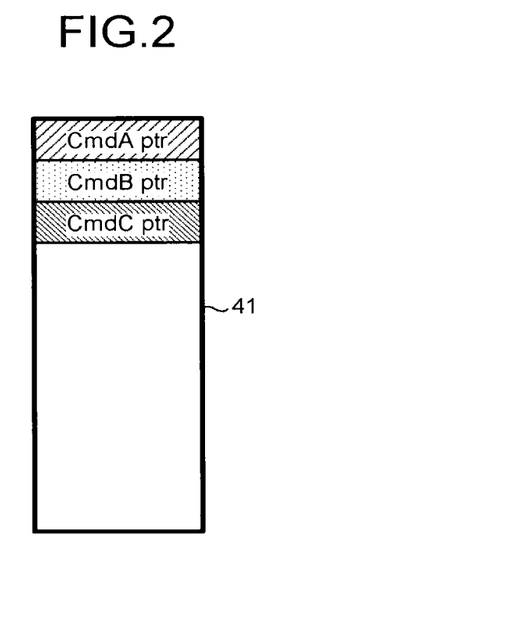
FIG. 2 is a conceptual diagram illustrating a pointer buffer.
Figure 3:
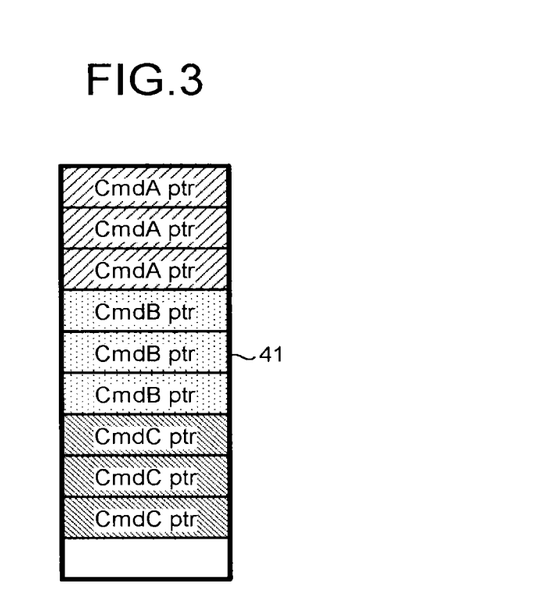
FIG. 3 is a conceptual diagram illustrating a pointer buffer.

FIGS. 2 and 3 illustrate pointer storage examples in the pointer buffer 41. Pointers of three commands are stored in both of FIGS. 2 and 3. In the case of FIG. 2, pointers corresponding to the first type commands are stored, and thus there is still space in the capacity of the pointer buffer 41. In contrast, in the case of FIG. 3, pointers corresponding to the second type commands are stored, and thus there is not sufficient space in the capacity of the pointer buffer 41. Therefore, pointers corresponding to the second type command cannot be further stored in the pointer buffer 41 in the state of FIG. 3.

Figure 4:
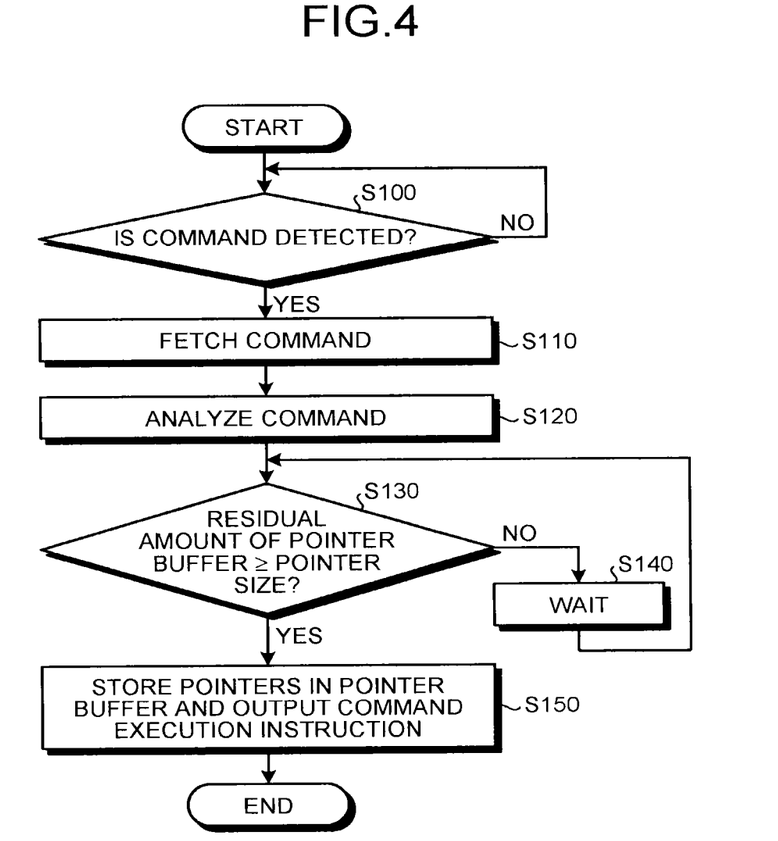
FIG. 4 is a flowchart illustrating an operation procedure of a front end unit of the first embodiment.

FIG. 4 illustrates a processing procedure of the front end unit 20a of the first embodiment. First, the command buffer unit 30 detects existence of a command from set content of the control register 31 (step S100). In the control register 31, the register information in which the presence or absence of commands, the processing order of commands, and the number of commands are specified is set. An address of the command region 3a of the host memory 3 is notified to the memory system 100, in advance. The command buffer unit 30 fetches the number of commands specified by the register information from the command region 3a of the host memory 3 in the processing order of the commands, and buffers the fetched commands in the command buffer 32 through the PCIe bus 5 (step S110).

The command buffer unit 30 sequentially analyzes the content of the buffered commands (step S120). In this analysis, the number of pointers necessary for command execution is calculated based on the data size and the pointer information included in the commands.

First, processing of when the command is the second type command having a large data size will be described. The command buffer unit 30 acquires a current residual quantity (residual account) of the pointer buffer 41 from the data transfer unit 40, and determines whether a plurality of pointers specified by the command can be stored in the pointer buffer 41 by comparing the pointer residual quantity and the pointer size of the plurality of pointers specified by the command (step S130). For example, when the capacity of the pointer buffer 41 is set by a value converted into the number of pointers, the pointer residual quantity and the number of pointers specified by the command are compared.

When the determination of step S130 is Yes, the command buffer unit 30 outputs an execution instruction of the command to the command execution unit 60 of the back end unit 20b, and notifies the data transfer unit 40 of the command (step S150). The command execution unit 60 that receives the execution instruction of the command and the data transfer unit 40 that is notified the command are then operated in parallel regarding the command.

The command execution unit 60 performs the logical/physical address translation processing regarding the notified command and the like, activates a plurality of memory chips of the NAND 10 necessary for data transfer, and executes the data transfer between the plurality of memory chips and the data buffer 50.

Meanwhile, the data transfer unit 40 stores, in the pointer buffer 41, the head pointer included in the pointer information of the command notified from the command buffer unit 30. Further, the data transfer unit 40 fetches the second and subsequent pointers ptr from the pointer region 3c of the host memory 3 using the pointer location information of the second and subsequent pointers included in the pointer information, and stores a plurality of fetched pointers in the pointer buffer 41. Further, the data transfer unit 40 performs data transfer between the host memory 3 and the data buffer 50 using the pointers stored in the pointer buffer 41. The pointers, the command of which is completed, are invalidated in the pointer buffer 41.

When the command is a read command, the command execution unit 60 starts data transfer from a memory chip that becomes readable to the data buffer 50. Then, transferrable read data are buffered in the data buffer 50, and thus the data transfer unit 40 transfers the read data buffered in the data buffer 50 to the data region 3b of the host memory 3 in the order of becoming transferrable, using the pointers stored in the pointer buffer 41. The data transfer unit 40 invalidates one to a plurality of pointers included in the command, data transfer of which is completed, after the one to the plurality of pointers becomes the oldest in the pointer buffer 41.

When the command is a write command, the data transfer unit 40 sequentially fetches the write data stored in the data region 3b of the host memory 3 using the pointers stored in the pointer buffer 41, and buffers the fetched write data in the data buffer 50. The command execution unit 60 performs the logical/physical address translation processing, and the like, reads out the write data buffered in the data buffer 50, and executes data transfer of data to be written in the NAND 10. When notifying completion of the command from the command execution unit 60, the data transfer unit 40 invalidates one to a plurality of pointers included in the notified command after the one to the plurality of pointers becomes the oldest in the pointer buffer 41.

When the determination of step S130 is No, the command buffer unit 30 waits the execution instruction of the command to the command execution unit 60 and the notification of the command to the data transfer unit 40 until the storage of the pointers in the pointer buffer 41 becomes available (step S140). Then, following that, when all of the pointers specified by the command are able to be stored in the pointer buffer 41, the command buffer unit 30, the data transfer unit 40, and the command execution unit 60 executes the above-described processing of step S150.

Next, processing of when the command is the first type command having a small data size will be described. The command buffer unit 30 acquires a current residual quantity of the pointer buffer 41 from the data transfer unit 40, and determines whether the pointers specified by the command can be stored in the pointer buffer 41 by comparing the pointer residual quantity and the size of one or two pointers specified by the command (step S130).

When the determination of step 3130 is Yes, the command buffer unit 30 outputs an execution instruction of the command to the command execution unit 60 of the back end unit 20b, and notifies the data transfer unit 40 of the command (step S150). The command execution unit 60 that receives the execution instruction of the command and the data transfer unit 40 that is notified the command are then operated in parallel.

The command execution unit 60 performs the logical/physical address translation processing, and the like, activates a plurality of memory chips of the NAND 10 necessary for data transfer, and executes the data transfer between the plurality of activated memory chips and the data buffer 50. Meanwhile, the data transfer unit 40 stores, in the pointer buffer 41, the head pointer and/or the second pointer included in the pointer information of the command notified from the command buffer unit 30. Further, the data transfer unit 40 performs data transfer between the host memory 3 and the data buffer 50 using the pointers stored in the pointer buffer 41. The pointers, the command of which is completed, are invalidated in the pointer buffer 41.

When the determination of step S130 is No, the command buffer unit 30 waits the execution instruction of the command to the command execution unit 60 and the notification of the command to the data transfer unit 40 until the storage of the pointers in the pointer buffer 41 becomes available (step S140). Then, following that, when all of the pointers specified by command are able to be stored in the pointer buffer 41, the command buffer unit 30, the data transfer unit 40, and the command execution unit 60 executes the above-described processing of step S150.

Note that, in the above description, the data transfer unit 40 and the command execution unit 60 are operated in parallel. However, to make the control easier, the operation of the command execution unit 60 may be started after the data transfer unit 40 acquires pointers from the host memory 3.

Next, the capacity of the pointer buffer 41 will be described. If the pointer buffer 41 is removed, and the pointers are read from the host memory 3 every time preparation of the NAND 10 side is ready, the transfer speed is decreased due to an overhead thereof.

In contrast, if all of pointers of the number of commands that may be executed in parallel by the storage device are read in advance, the capacity of the pointer buffer 41 becomes large. For example, assume that a maximum data size of one command is 2 MB. When the size of one data region 3b is 4 KB, pointers of 2 MB/4 KB=512 are necessary. When the host 1 is a 64-bit address space, and the size per pointer is 8 bytes, a memory of 8×512=4 KB is necessary for the pointers of one command. When the throughput of command processing of one command/1 μs is required as required performance, when the NAND 10 having 50 μs access latency per one time is used, parallel processing using at least 50 or more memory chips is necessary. Further, the latency of the command execution unit 60 is influenced by variation of the access order or the processing time other than an access to the NAND 10, and thus the parallel processing of about 128 to 256 is desirable as the degree of parallel of commands. In that case, to store the pointers, a memory of about 4 KB×256=1 MB is necessary. As described above, when all of pointers of the number of commands that may be executed in parallel are read in advance, a memory of about 1 MB is necessary.

Next, to realize the performance of one command/1 μs, consider an SSD provided with the NAND 10 including 64 memory chips. Assume that the size of a paper buffer in the memory chip is 16 KB. When all of the memory chips are activated and read is performed with the configuration, data of 1 MB is read in parallel. When a plurality of stages of commands are queued (for example, four stages), it can be expected that the data transfer is effectively performed on a steady basis in a state where almost all of the memory chips are activated. That is, in this example, when data of about 4 MB can be processed in parallel, sufficient data transfer to the NAND 10 having 64 chips becomes possible. A memory amount necessary for the pointers corresponding to the data of 4 MB is 8 KB (=(4 MB/4 KB)×8 bytes). Therefore, the capacity of the pointer buffer 41 is desirably about 8 KB in the above assumption. That is, in the first embodiment, a part of pointers of commands that may be executed in parallel is stored in the pointer buffer 41 in command units, and the point is desirably about 8 KB in the case of the above condition.

As described above, in the first embodiment, a part of pointers of commands that may be executed in parallel is stored in the pointer buffer 41 in command units. Further, in the first embodiment, whether pointers specified by a command can be stored in the pointer buffer 41 is determined, and when the pointers can be stored, execution of the command and acquisition processing of the pointers are performed. When the pointers cannot be stored, the execution of the command and the acquisition processing of the pointers are held until the storage of the pointers in the pointer buffer 41 becomes available. Therefore, a memory capacity for pointer buffer can be reduced, compared with a case where the storage device tries acquiring all of pointers corresponding to a command, execution of which is instructed.

Further, the first embodiment has an effect that processing at the time of emergency shutdown becomes easier. Typically, in the storage device, in emergency shutdown processing due to sudden power off, it is desirable to cancel the processing in command units as much as possible when the processing of all of commands in process cannot be processed. Note that, there are a case in which the SSD 100 detects the emergency shutdown by notification from the host 1, and a case in which the emergency shutdown is detected by misbehaving power off detection of the SSD 100 itself. Therefore, in the first embodiment, at the time of emergency shutdown, only a command, the pointers of which are buffered in the pointer buffer 41, becomes an object to be processed among the commands buffered in the command buffer 32, and a command, the pointers of which are not buffered in the pointer buffer 41, is not an object to be processed among the commands buffered in the command buffer 32. Therefore, the command buffer unit 30 provides the data transfer unit 40 and the command execution unit 60 with an execution instruction only to the command, the pointers of which are buffered in the pointer buffer 41. In other words, when detecting emergency shutdown, the command buffer unit 30 aborts the processing of commands determined not to be able to be stored the pointer in the pointer buffer 41 in step S130 of FIG. 4, among the commands buffered in the command buffer 32, and causes the commands not to be executed by the data transfer unit 40 and the command execution unit 60.

As described above, in the first embodiment, a part of pointers of commands that may be executed in parallel is stored in the pointer buffer 41 in command units. Therefore, if a time to process data corresponding to the part of pointers is secured, the rest of the commands are in a state of before execution, and thus the execution can be easily canceled.

Note that, in the above description, a FIFO system is employed as the pointer buffer 41. However, pointers that are buffered later may be deleted (invalidated) earlier depending on a state, instead of strictly sticking to the FIFO system.

Further, in the above description, when the execution of a command is completed, pointers corresponding to the command, execution of which is completed, are deleted (invalidated) from the pointer buffer 41. However, the pointers may be deleted from the pointer buffer 41 when data transfer corresponding to the pointers is completed.

Further, in the above description, the point of time of completion of a command is the point of time when write to the NAND 10 is completed in the case of a write command. However, a point of time when the data transfer unit 40 completes transfer of write data of the host memory 3 to the data buffer 50 may be the point of time of completion of a command, and pointers corresponding to a command, execution of which is completed at the point of time, may be deleted from the pointer buffer 41.

Second Embodiment

Figure 5:
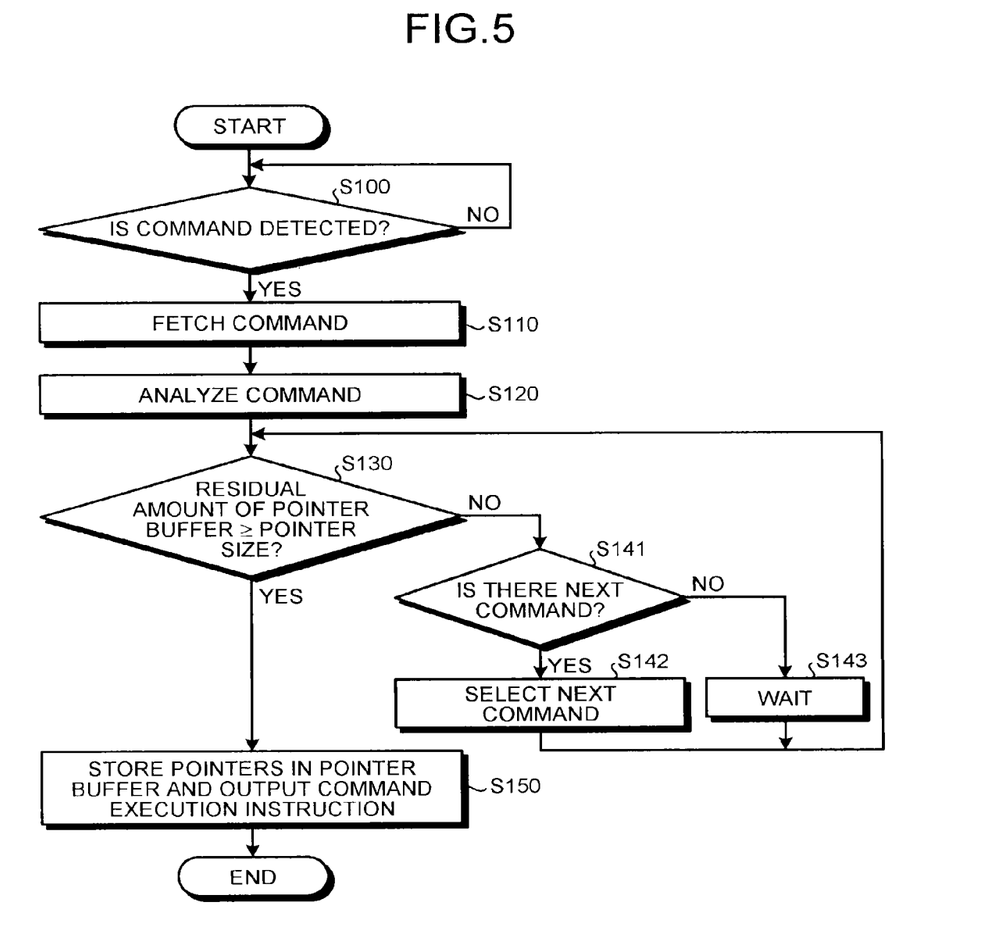
FIG. 5 is a flowchart illustrating an operation procedure of a front end unit of a second embodiment.

In the second embodiment, when pointers cannot be stored in a pointer buffer 41, whether all of pointers that belong to another command in a command buffer 32 can be stored in the pointer buffer 41, and when the pointers can be stored, the pointers that belong to another command are stored in the pointer buffer 41. FIG. 5 illustrates a processing procedure of a front end unit 20a of the second embodiment. In FIG. 5, step S140 of FIG. 4 is replaced with steps S141 to S143.

When determination of step S130 is No, a command buffer unit 30 determines whether a command to be executed next is stored in the command buffer 32 (step S141). When the command is stored, the command buffer unit 30 selects the next command (step S142), and determines whether one to a plurality of pointers specified by the next command can be stored in the pointer buffer 41 (step S130). When the determination of step S130 is No, the command buffer unit 30 further executes the loop of steps S141 and S142, and step S130, and searches the command buffer 32 for a command, pointers of which can be stored in the pointer buffer 41.

With the search, when finding a command, pointers of which can be stored in the pointer buffer 41, the command buffer unit 30 executes processing of step S150 with respect to the command. When a command that can obtain Yes in the determination of step S130 cannot be searched from the commands stored in the command buffer 32, the command buffer unit 30 waits an execution instruction of the command to a command execution unit 60 and notification of the command to a data transfer unit 40 until the storage of the pointers in the pointer buffer 41 becomes available (step S143).

As described above, in the second embodiment, when the pointers cannot be stored in the pointer buffer 41, whether pointers that belong to another command in the command buffer 32 can be stored in the pointer buffer 41 is determined. When the pointers can be stored, the pointers that belong to another command are stored in the pointer buffer 41. Therefore, the data transfer efficiency between a host 1 and an SSD 100 can be improved.

Third Embodiment

Figure 6:
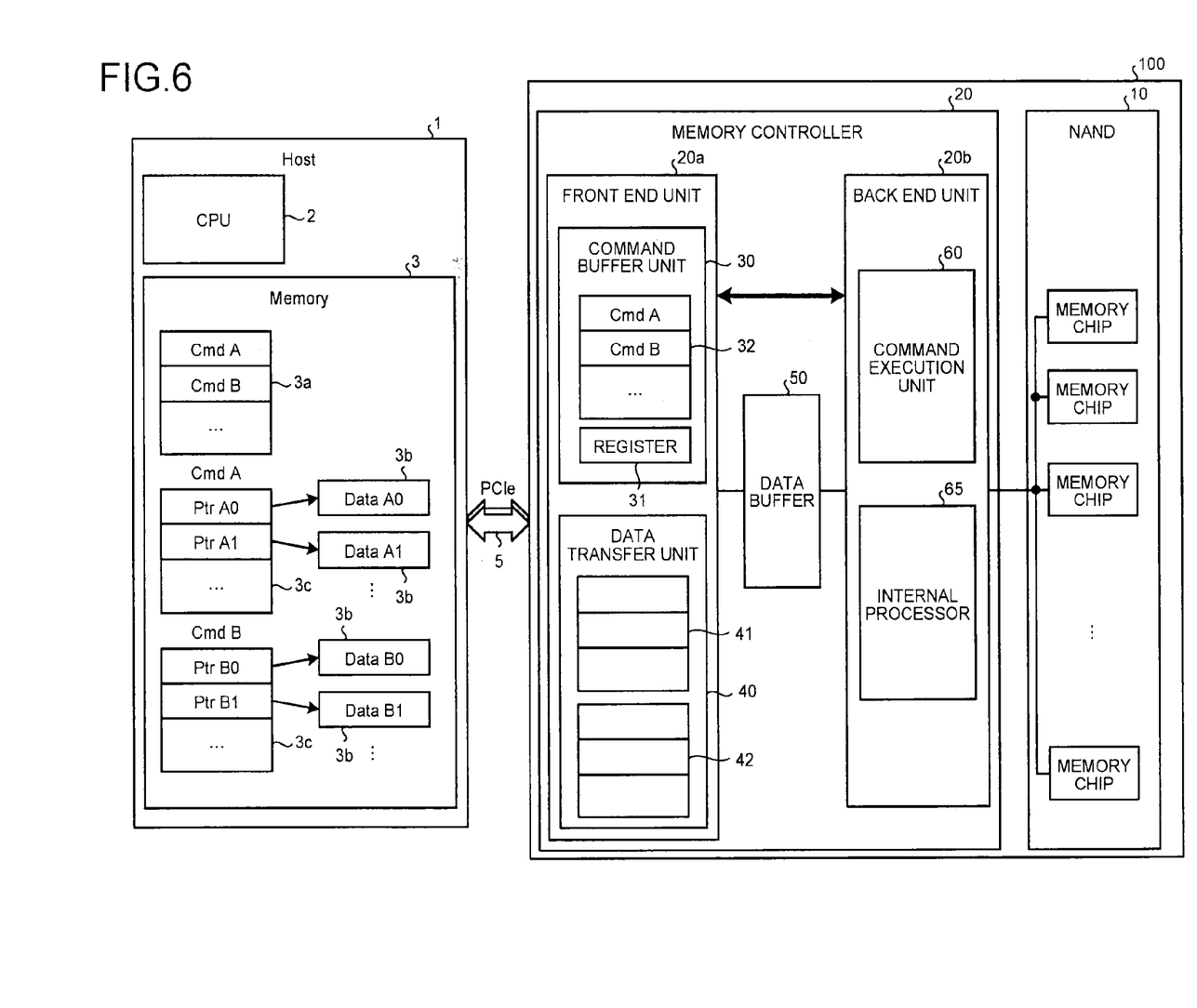
FIG. 6 is a function block diagram illustrating an internal configuration of a memory system of a third embodiment.

FIG. 6 illustrates a configuration example of a memory system of a third embodiment. In the third embodiment, pointers of a command having a data size larger than a threshold are managed in a pointer buffer 41, and pointers of a command having a small data size are managed in another pointer table 42. For example, a second type command is managed in the pointer buffer 41, and a first type command is managed in the pointer table 42.

When the pointer buffer 41 is configured to have a FIFO structure, like the first embodiment, after the pointer buffer 41 becomes full, a new free space cannot be secured in the pointer buffer 41 even if other commands are completed, when processing of the oldest command is not completed, and next command processing cannot be started. Therefore, in the third embodiment, pointers of a command having a small data size can be stored in the pointer table 42 up to a predetermined number, regardless of a state of the pointer buffer 41. The pointer table 42 has entries corresponding to the number of commands executable in a command execution unit 60, and can store a head pointer and a second pointer in each entry.

Figure 7:
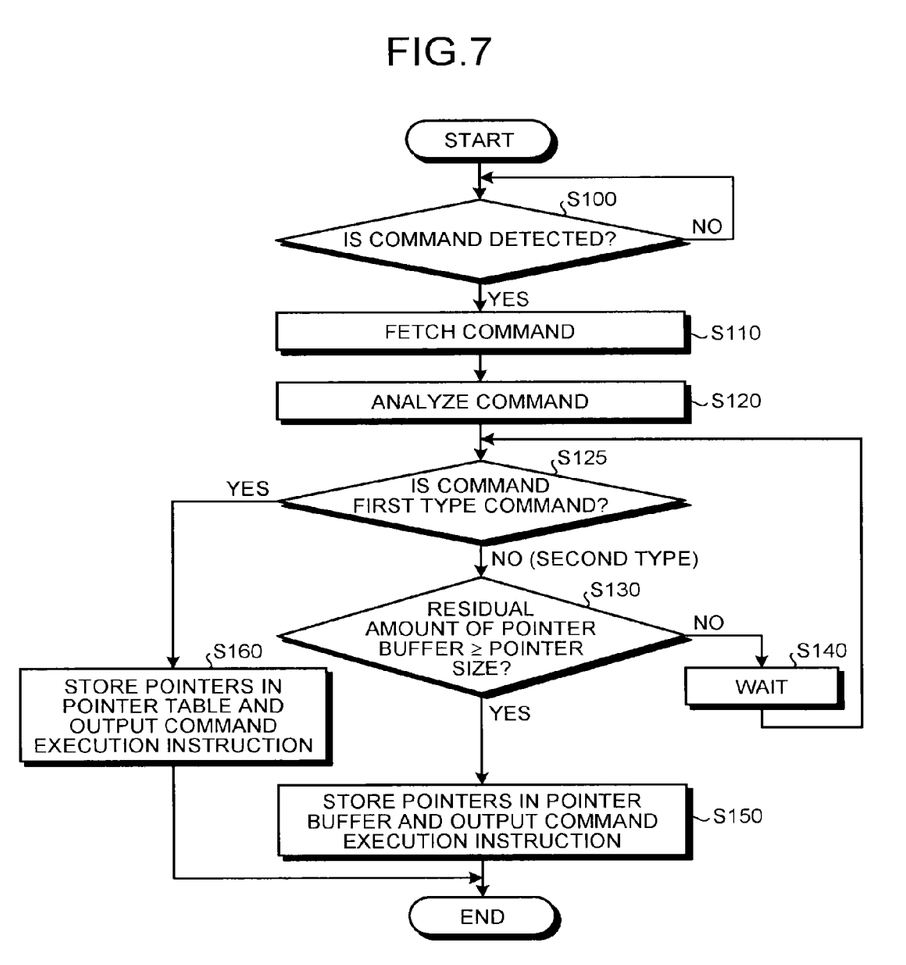
FIG. 7 is a flowchart illustrating an operation procedure of a front end unit of the third embodiment.

FIG. 7 illustrates a processing procedure of a front end unit 20a of the third embodiment. In FIG. 7, steps S125 and S160 are added to FIG. 4.

A command buffer unit 30 sequentially analyzes content of a command buffered in a command buffer 32 (step S120). Following that, the command buffer unit 30 determines whether the command is the first type command having a small data size, or the second type command having a large data size (step S125). As a result of the determination, when the command is the first type command, the command buffer unit 30 outputs an execution instruction of the command to the command execution unit 60 of a back end unit 20b, and notifies a data transfer unit 40 of the command. The command execution unit 60 that receives the execution instruction of the command, and the data transfer unit 40 that is notified the command are then operated in parallel regarding the command, similarly to the first embodiment.

The data transfer unit 40 stores, in the pointer table 42, a head pointer and/or a second pointer included in pointer information of the command notified from the command buffer unit 30. Further, the data transfer unit 40 performs data transfer between a host memory 3 and a data buffer 50 using the pointers stored in the pointer table 42. The pointers, the command of which is completed, are invalidated in the pointer table 42.

When determining that the command is the second type command having a large data size in the determination of step S125, the command buffer unit 30 determines whether a plurality of pointers specified by the second type command can be stored in the pointer buffer 41 (step S130). When the pointers can be stored, the command buffer unit 30 outputs an execution instruction of the command to the command execution unit 60 of the back end unit 20*b*, and notifies the data transfer unit 40 of the command (step S150). Further, when the pointers cannot be stored, the command buffer unit 30 waits the execution instruction of the command to the command execution unit 60 and the notification of the command to the data transfer unit 40 until the storage of the pointers in the pointer buffer 41 becomes available. In step 150, processing similar to that of the first embodiment is performed.

In the third embodiment, pointers of a command having a small data size are managed by the pointer table 42 other than the pointer buffer 41 of a FIFO system. Therefore, the pointers of a command having a small data size can be stored in the pointer table 42, regardless of a state of the pointer buffer 41 of a FIFO system. Accordingly, even if the processing of a command having large data is delayed, a command having small data can be subjected to by-pass processing.

(Fourth Embodiment)

In the fourth embodiment, in FIG. 6, pointers of a command having a data size larger than a threshold are managed in a pointer table 42 and a pointer buffer 41, and pointers of a command having a small data size are managed in the pointer table 42 only. For example, a second type command is managed in the pointer table 42 and the pointer buffer 41, and a first type command is managed in the pointer table 42. For example, a head pointer specified by the command to one to a plurality of pointers are stored in the pointer table 42, and the rest of the pointers that cannot be stored in the pointer table 42 are stored in the pointer buffer 41.

Figure 8:
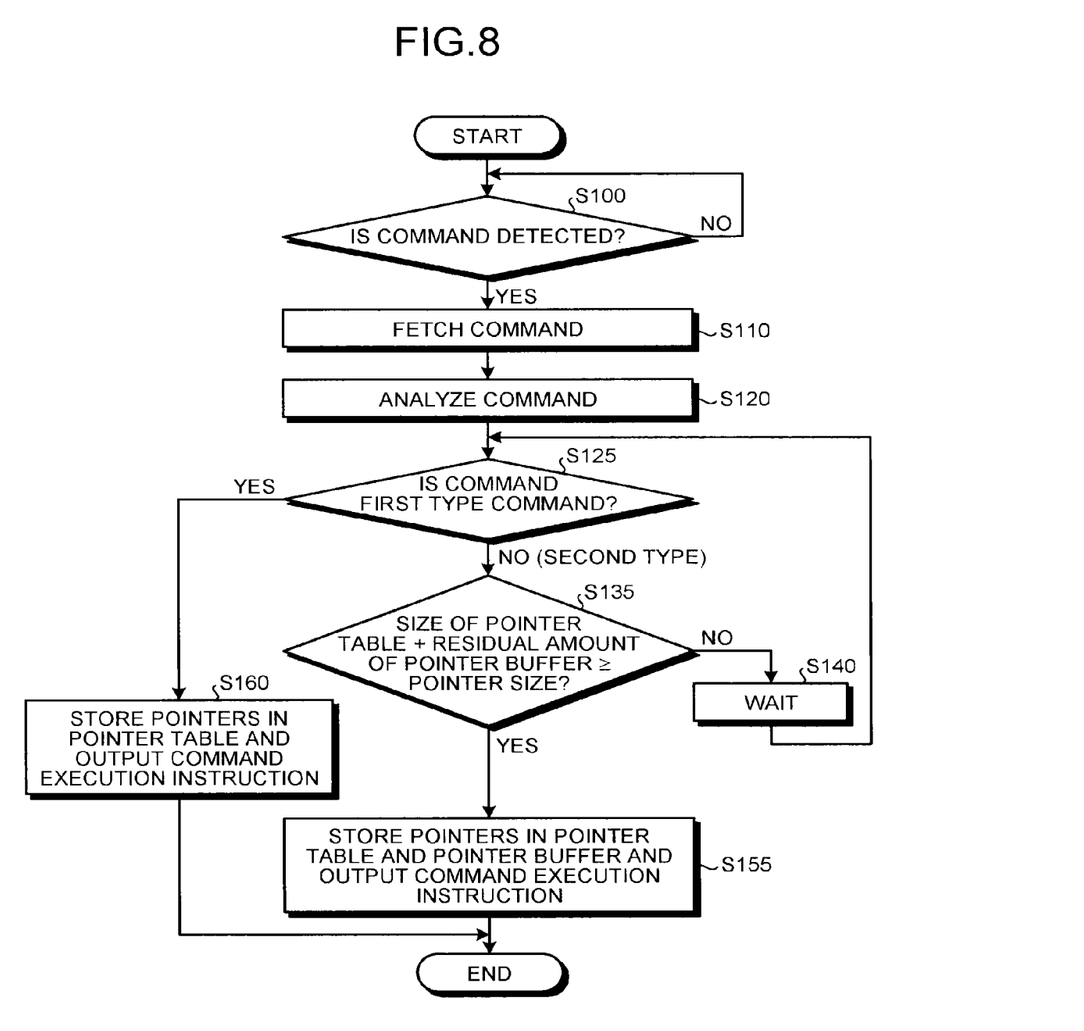
FIG. 8 is a flowchart illustrating an operation procedure of a front end unit of a fourth embodiment.

FIG. 8 illustrates a processing procedure of a front end unit 20*a* of the fourth embodiment. Step S130 of FIG. 7 is changed to step S135, and step S150 of FIG. 7 is changed to step S155. Processing content of other steps of FIG. 8 is similar to that of FIG. 7.

A command buffer unit 30 sequentially analyzes content of a command buffered in a command buffer 32 (step S120). Next, the command buffer unit 30 determines whether the command is the first type command having a small data size, or the second type command having a large data size (step S125). As a result of the determination, when the command is the first type command, the command buffer unit 30 outputs an execution instruction of the command to a command execution unit 60 of a back end unit 20*b*, and notifies a data transfer unit 40 of the command. The command execution unit 60 that receives the execution instruction of the command, and the data transfer unit 40 that is notified the command are then operated in parallel regarding the command, similarly to the first embodiment.

The data transfer unit 40 stores, in the pointer table 42, a head pointer and/or a second pointer included in pointer information of the command notified from the command buffer unit 30. Further, the data transfer unit 40 performs data transfer between a host memory 3 and a data buffer 50 using the pointers stored in the pointer table 42. The pointers, the command of which is completed, are invalidated in the pointer table 42.

When determining that the command is the second command having a large data size in the determination of step S125, the command buffer unit 30 determines whether a plurality of pointers specified by the second type command can be stored in the pointer table 42 and the pointer buffer 41 (step S135). When the pointers can be stored, the command buffer unit 30 outputs an execution instruction of the command to the command execution unit 60 of the back end unit 20*b*, and notifies the data transfer unit 40 of the command (step S155). Further, when the pointers cannot be stored, the command buffer unit 30 waits execution instruction of the command to the command execution unit 60 and the notification of the command to the data transfer unit 40 until the storage of the pointers in the pointer buffer 41 becomes available.

In step 155, the data transfer unit 40 stores a plurality of pointers specified by the command both in the pointer table 42 and the pointer buffer 41. For example, a head pointer specified by the command to one to a plurality of pointers are stored in the pointer table 42, and the rest of the pointers that cannot be stored in the pointer table 42 are stored in the pointer buffer 41, for example.

In the fourth embodiment, pointers from a head pointer specified by the command to one to a plurality of pointers are stored in the pointer table 42, and the rest of the pointers that cannot be stored in the pointer table 42 are stored in the pointer buffer 41. Therefore, a use amount of the pointer buffer 41 can be reduced when pointers of a command having a large data size are stored.

Note that the above embodiment has been applied to a host interface that includes first and second type commands. However, the present invention can be applied to a host interface that fetches pointers of all commands from the host memory 3.

Further, in step S125 of FIG. 7 and step S135 of FIG. 8, branch determination of step S125 may be performed according to whether the number of pointers specified by a command is larger than a threshold K, instead of branching according to whether the command is the first type or the second type. As the threshold K, a threshold having a size that is a size per one command of the pointer table 42 is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system configured to be connected with a host device, the host device including a memory in which a command, a pointer, and data are stored, the pointer pointing to a location of the data, the memory system comprising:
    a non-volatile memory including a plurality of blocks, the block being a unit of data erasure;
    a data buffer;
    a first controller configured to acquire the command from the memory of the host device, and to perform first data transfer between the memory of the host device and the data buffer; and
    a second controller configured to perform second data transfer between the non-volatile memory and the data buffer according to the command,
    wherein the first controller includes
    a first buffer,
    a second buffer, and
    a control unit, and
    wherein the control unit is configured to:
    buffer, in the first buffer, the command acquired from the memory, determine whether one or a plurality of pointers corresponding to the buffered command is able to be stored in the second buffer, when the pointer is capable of being stored in the second buffer, store the pointer in the second buffer, cause the second controller to execute the command and to perform the second data transfer, and execute the first data transfer corresponding to the command using the pointer stored in the second buffer, and, when the pointer is not capable of being stored in the second buffer, wait for execution of the command until the pointer becomes capable of being stored in the second buffer.

2. The memory system according to claim 1, wherein the control unit is configured to store, in the second buffer, the pointer acquired from the memory.

3. The memory system according to claim 1, wherein the control unit is configured to determine whether all of pointers specified by one command are able to be stored in the second buffer.

4. The memory system according to claim 1, wherein the control unit is configured to invalidate, in the second buffer, the pointer corresponding to the command of which the execution is completed.

5. The memory system according to claim 1, wherein the second buffer is FIFO, the second controller further includes a first table, and wherein the control unit is configured to:

manage, in the first table, a pointer specified by a command having the number of pointers of a predetermined threshold or less, and manage, in the second buffer, a pointer specified by a command having the number of pointers larger than the predetermined threshold.

6. The memory system according to claim 1 wherein the second buffer is FIFO, the second controller further includes a first table, and wherein the control unit is configured to:

manage, in the first table, a pointer specified by a command having the number of pointers of a predetermined threshold or less, and manage, in the first table and the second buffer, a pointer specified by a command having the number of pointers larger than the predetermined threshold.

7. The memory system according to claim 1, wherein the control unit is configured to when the pointer is not capable of being stored in the second buffer, determine whether an another command of which the pointer is able to be stored in the second buffer, exist or not, and store one or a plurality of pointers corresponding to the another command in the second buffer when another command exists.

8. The memory system according to claim 1, wherein the first controller is configured to when emergency shutdown is detected, abort processing of the command determined not to be able to be stored the pointer in the second buffer, among commands buffered in the first buffer, and cause the second controller not to execute the command determined not to be able to be stored the pointer in the second buffer.

9. A memory controller configured to be connected with a host device and a non-volatile memory, the host device including a memory in which a command, a pointer, and data are stored, the pointer pointing to a location of the data, the non-volatile memory including a plurality of blocks, the block being a unit of data erasure, the memory controller comprising:

a data buffer;

a first controller configured to acquire the command from the memory of the host device, and to perform first data transfer between the memory of the host device and the data buffer; and a second controller configured to perform second data transfer between the non-volatile memory and the data buffer according to the command, wherein the first controller includes a first buffer, a second buffer, and a control unit, and wherein the control unit is configured to:

buffer, in the first buffer, the command acquired from the memory, determine whether one or a plurality of pointers corresponding to the buffered command is able to be stored in the second buffer, when the pointer is capable of being stored in the second buffer, store the pointer in the second buffer, cause the second controller to execute the command and to perform the second data transfer, and execute the first data transfer corresponding to the command using the pointer stored in the second buffer, and, when the pointer is not capable of being stored in the second buffer, wait for execution of the command until the pointer becomes capable of being stored in the second buffer.

10. The memory controller according to claim 9, wherein the control unit is configured to store, in the second buffer, the pointer acquired from the memory.

11. The memory controller according to claim 9, wherein the control unit is configured to determine whether all of pointers specified by one command are able to be stored in the second buffer.

12. The memory controller according to claim 9, wherein the control unit is configured to invalidate, in the second buffer, the pointer corresponding to the command of which the execution is completed.

13. The memory controller according to claim 9, wherein the second buffer is FIFO, the second controller further includes a first table, and wherein the control unit is configured to:

manage, in the first table, a pointer specified by a command having the number of pointers of a predetermined threshold or less, and manage, in the second buffer, a pointer specified by a command having the number of pointers larger than the predetermined threshold.

14. The memory controller according to claim 9, wherein the second buffer is FIFO, the second controller further includes a first table, and wherein the control unit is configured to:

manage, in the first table, a pointer specified by a command having the number of pointers of a predetermined threshold or less, and manage, in the first table and the second buffer, a pointer specified by a command having the number of pointers larger than the predetermined threshold.

15. The memory controller according to claim 9, wherein the control unit is configured to when the pointer is not capable of being stored in the second buffer, determine whether an another command of which the pointer is able to be stored in the second buffer, exist or not, and store one or a plurality of pointers corresponding to the another command in the second buffer when another command exists.

16. The memory controller according to claim 9, wherein the first controller is configured to when emergency shutdown is detected, abort processing of the command determined not to be able to be stored the pointer in the second buffer, among commands buffered in the first buffer, and cause the second controller not to execute the command determined not to be able to be stored the pointer in the second buffer.

* * * * *